United States Patent [19]
Weintraub et al.

[11] 3,740,710
[45] June 19, 1973

[54] TIRE TREAD DEPTH MEASUREMENT SYSTEM

[75] Inventors: Arthur Weintraub, Henry A. Kalina, both of Fort Wayne, Ind.; Robert F. Cahill, Westport, Conn.

[73] Assignee: International Telephone and Telegraph Corporation, Nutley, N.J.

[22] Filed: June 1, 1971

[21] Appl. No.: 148,565

[52] U.S. Cl.................. 340/52 R, 73/8, 73/146, 209/82, 340/213 R, 340/421
[51] Int. Cl. ............................................. B60q 1/00
[58] Field of Search ............... 340/52 R, 52, 213 R, 340/421; 73/146, 8; 209/80, 82

[56] References Cited
UNITED STATES PATENTS
| | | | |
|---|---|---|---|
| 3,183,481 | 5/1965 | McCrory | 340/52 R |
| 3,398,397 | 8/1968 | O'Connell | 340/52 R |
| 3,237,310 | 3/1966 | Reiner | 73/146 |

*Primary Examiner*—John W. Caldwell
*Assistant Examiner*—Robert J. Mooney
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi

[57] ABSTRACT

An automatic tire tread depth measurement system for automobiles wherein two support units are located to receive two tires mounted on an axle. Three probe plates, each probe plate containing 20 spring-loaded probe pins in a staggered configuration, are mounted in each of the support plates. The two outer probe plates of each set of three are located so as to respond to the two peripheral tread grooves of each tire if they are of sufficient depth. The center probe plate of each set is positioned to respond to one of the center grooves of each tire if it is of sufficient depth. A two-position switch is connected to each of the probe pins, each switch having one output if the probe with which it is associated is depressed and another output if the probe with which it is associated is not depressed. The simultaneous signal outputs from the switches are multiplexed to provide switching signals in serial form and are provided to a logic network for processing. The logic network provides a "pass" signal if all six tested grooves of the two tires on an axle are satisfactory and a "fail" signal if any one of the grooves is worn more than a predetermined amount.

8 Claims, 9 Drawing Figures

INVENTORS
ARTHUR WEINTRAUB
HENRY A. KALINA
ROBERT F. CAHILL
BY
Herbert Stern
ATTORNEY Patented June 19, 1973

INVENTORS
ARTHUR WEINTRAUB
HENRY A. KALINA
ROBERT F. CAHILL
BY Herbert Stern
ATTORNEY Patented June 19, 1973 3,740,710

INVENTORS
ARTHUR WEINTRAUB
HENRY A. KALINA
BY ROBERT F. CAHILL
ATTORNEY

Fig. 6

TIRE TREAD DEPTH MEASUREMENT SYSTEM

BACKGROUND OF THE INVENTION

This invention relates to an automatic tire tread depth measurement system, and more particularly to such a system which determines tread depth by measuring the depth of the outside or peripheral grooves and the center groove of a tire.

Automatic tire tread depth measurement systems known in the art are frequently of the type which include two vertically arranged layers of sectioned electrical conductor embedded within a compressible mat and which operate on the theory that if a worn tire rolls over the mat the upper conductor sections will be depressed and come into contact with the lower conductor sections, thereby completing an electrical circuit and sounding an alarm, whereas if an upper conductor section contacts a sufficiently deep groove it will not be depressed into contact with a lower conductor section and therefore no circuit will be completed. These systems, however, of which U.S. Pat. No. 3,398,397 is an example, are deficient in that the test area, i.e., the area in which the upper and lower conductors are sectioned, must be made narrower than the narrowest tire which is to be tested and therefore a wider tire, of the type which is mounted on a large automobile, might have one of its outer treads worn smooth while having enough tread remaining on the rest of the tire to prevent an indication of failure. Further, this system requires only that the tire under test have a single groove of sufficient depth in the test area to provide a pass indication and therefore a clearly unsafe tire could be passed. To obtain an indication of failure it is necessary that the tire under test be completely worn, with no grooves of sufficient depth remaining.

Another type of automatic tire tread depth measurement system known in the art, of which U.S. Pat. No. 3,183,481 is an example, utilizes a plurality of spring-loaded probes, or fingers, which extend from a plate and which are depressed if they are contacted by the rib of a tire and which remain in their extended position if they enter the groove of a tire. Each of the probes contacts a cord-line to which switches are attached, said cord-line being coupled to a fixed point via a spring. The theory of operation of this system is that the cord-line is non-extensible and the number of probes depressed will control the apparent length of the cord-line, thereby extending the spring or allowing it to contract, this in turn moving the switches attached to the cord-line into various contact positions. This system is deficient due to the fact that wider tires have more ribs and grooves than narrower tires and this will result in an apparent shortening of the cord-line causing a pass indication, the pass indication being due however to the greater width of the tire rather than to the face that the tire has a sufficient number of grooves of satisfactory depth. Thus, a different system must be used for each tire size. Further, the system is deficient in that the cord-line is not truly non-extensible and the length thereof is dependent upon ambient temperatures and the degree of degradation due to use. Additionally, the spring which couples the cord-line to a stationary frame or other fixed point is also subject to degradation due to use and age and, therefore, the system must be frequently recalibrated.

SUMMARY OF THE INVENTION

Therefore, the main object of this invention is to provide an automatic tire tread depth measurement system which is capable of accurately determining if the tread depth of the tire under test is satisfactory.

A further object of this invention is to provide such a measurement system which may be utilized with tires of various widths.

A further object of this invention is to provide a tire tread depth measurement system which does not require frequent recalibration.

A further object of this invention is to provide a tire tread depth measurement system which is independent of external operating conditions.

According to the present invention there is provided an automatic tire tread depth measurement system comprising support means, means coupled to said support means for sensing the tread condition of a tire under test and providing a plurality of condition signals corresponding to the presence or absence of grooves exceeding a selected depth in said tire tread, and logic means coupled to said sensing means responsive to said plurality of condition signals for providing a first decision signal when said tire tread is satisfactory and a second decision signal when said tire tread is unsatisfactory.

It is a feature of this invention to provide a tire tread depth measurement system which measures the depth of the peripheral grooves of a tire as well as the depth of at least one of the middle grooves of said tire to determine if said tire is satisfactory for use.

Further objects and features of this invention will become more apparent by reference to the following description taken in conjunction with the accompanying drawings, in which:

DESCRIPTION OF THE PREFERRED EMBODIMENT

Figures 1, 2:
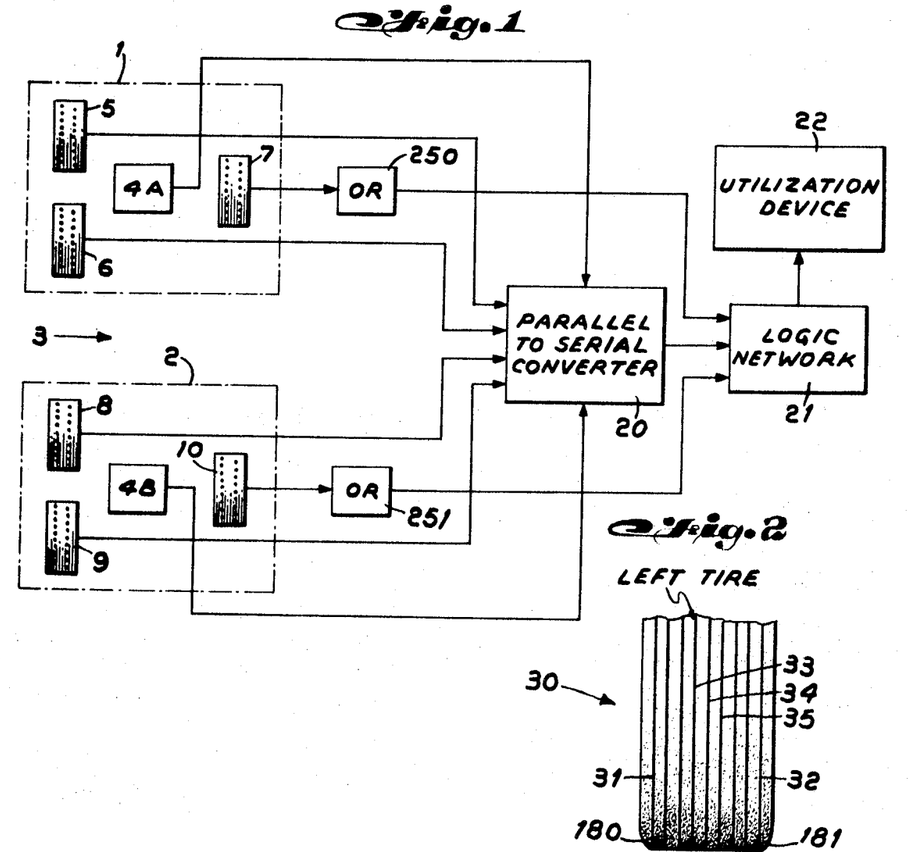
FIG. 1 is a schematic drawing of an arrangement according to the invention.
FIG. 2 is a drawing of an automobile tire of the type which is to be tested with regard to tread depth.
Figure 5A:
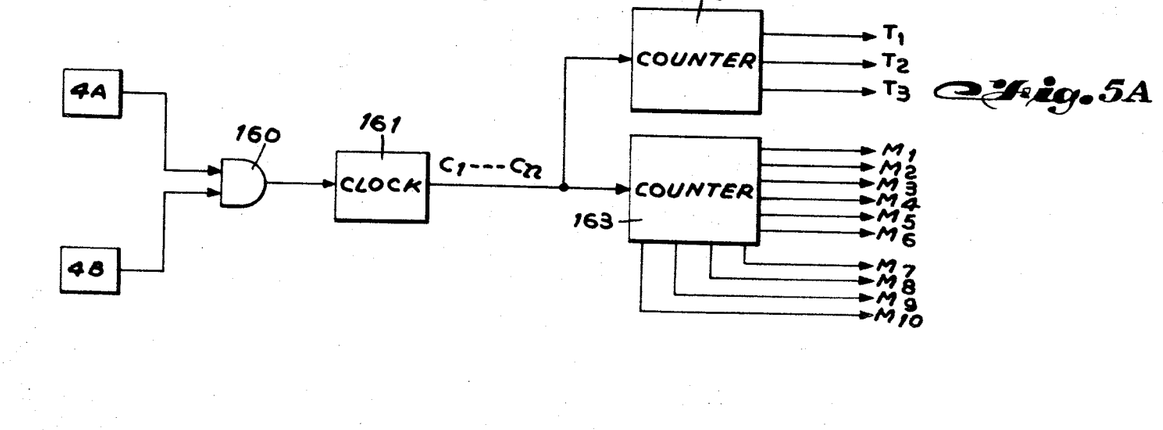
FIGS. 5A and 5B are schematic drawings illustrating the parallel-to-serial converter illustrated in FIG. 1.
Figure 5B:
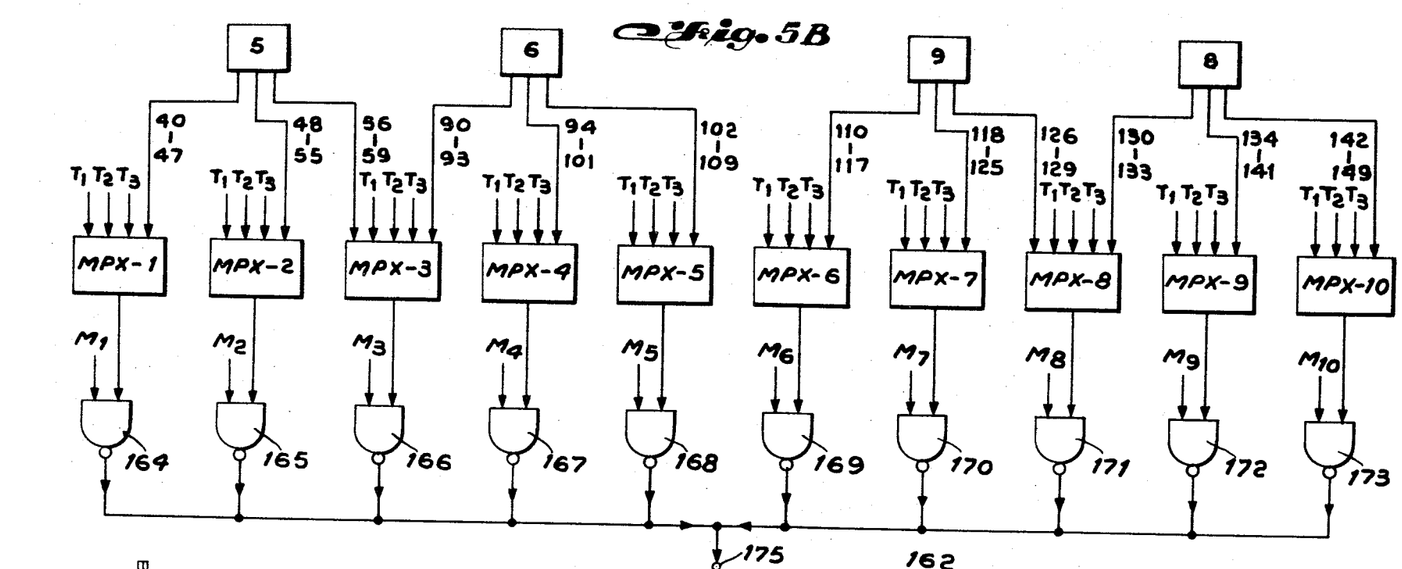

Referring now to FIG. 1, there is shown a schematic diagram of a tire tread depth measurement system including a floating, self-centering support plate 1 which includes a centering unit (not shown) of a type well known in the art, and a stationary support plate 2. As a vehicle rolls onto plates 1 and 2 in a direction shown by arrow 3, the left front tire contacts system start button or unit 4A and the right front tire contacts button 4B which activates the system in a manner which will be described below. At this time the left front tire is in contact with probe units 5–7 which are mounted in plate 1, and the right front tire is in contact with probe units 8–10 which are mounted in plate 2. The probe units 5–10, which each contains 20 spring-loaded probes in a staggered configuration, are more clearly illustrated in FIGS. 3A and 3B and will be more fully described below. The output of probe units 5, 6, 8 and 9, which comprises 80 binary signals are simultaneously transmitted to parallel-to-serial converter unit 20 which is illustrated in FIGS. 5A and 5B and the operation of which will be described below. The output of converter unit 20 is the aforementioned 80 binary signals from probe units 5, 6, 8 and 9 arranged in serial fashion and these 80 binary signals are transmitted to logic network 21 where they are processed, together with signals from OR gates 250 and 251 which receive inputs from probe units 7 and 10, respectively, logic network 21 transmitting a "pass" or "fail" signal to utilization device 22 which may be used to indicate the status of the tread depth of the tires to the system operator.

Referring now to FIG. 2, where there is shown a plan view of an automobile tire 30, the theory of operation of the subject device will now be discussed. It will be understood by those skilled in the art that if groove 31 and groove 32, both of which are outside or peripheral grooves, are of sufficient depth and if any one of the central grooves 33, 34 or 35 is also of sufficient depth then all the grooves of the tire must be satisfactory, and it is therefore not necessary to measure the depth of each groove in the tire to determine if the tread depth is such that the tire is safe for use.

Figures 3A, 3B:
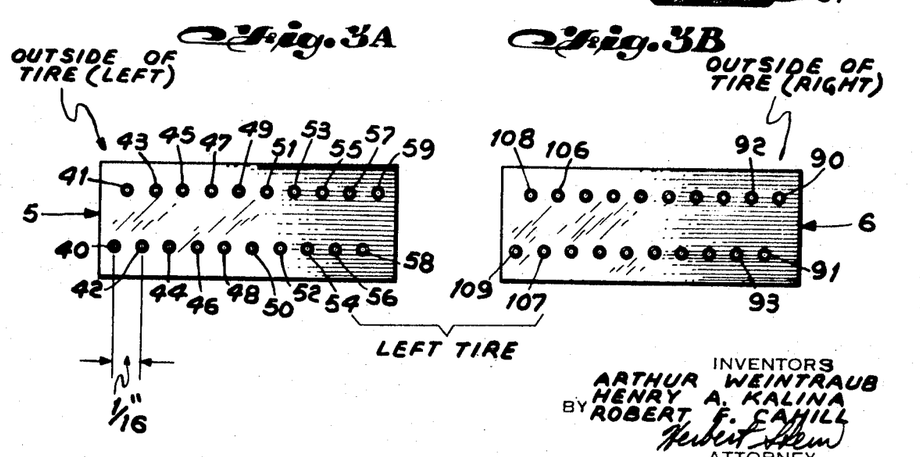
FIGS. 3A and 3B are detailed top views of probe units 5 and 6 illustrated in FIG. 1.

Referring now to FIGS. 3A and 3B there is illustrated a detailed top view of probe units 5 and 6 illustrated in FIG. 1. Turning now to FIG. 3A, it is seen that each unit, of which unit 5 is an example, comprises 20 vertically extending pins, here 40–59, arranged in a staggered relationship. The centers of each of the pins are spaced from each other by approximate one-sixteenth of an inch.

Figure 4:
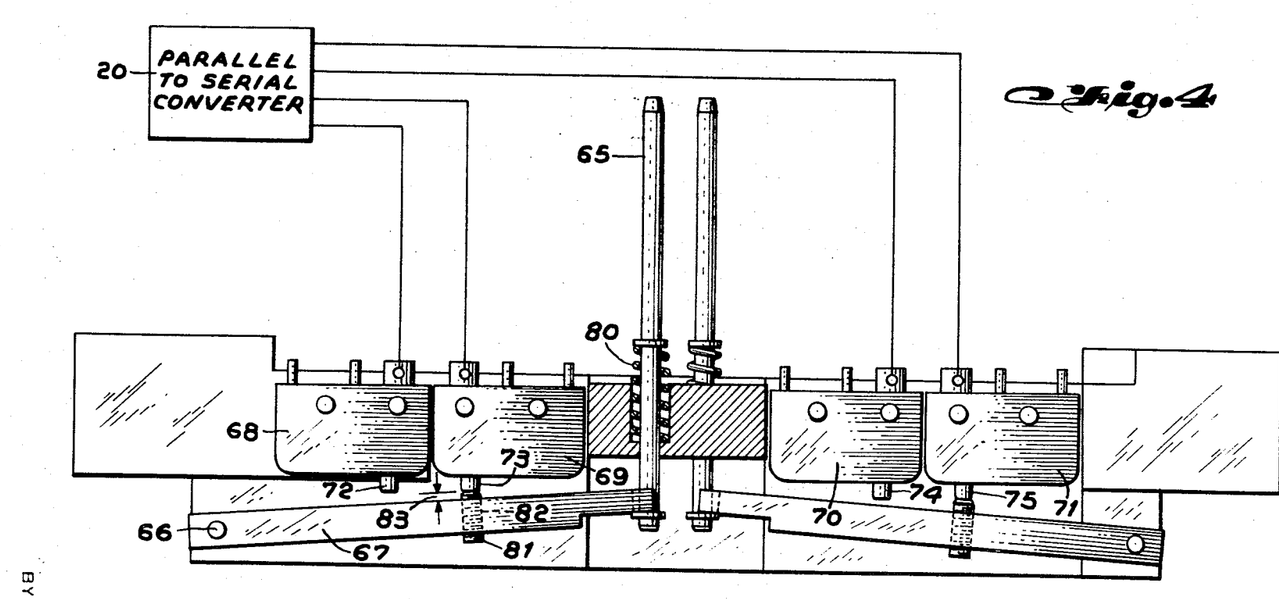
FIG. 4 is a partially sectioned side view of a probe unit illustrated in FIG. 1.

Referring now to FIG. 4 there is shown a partially sectioned side view of a probe unit, such as 5, which discloses the structure thereof in greater detail. A probe pin, such as 65, is mounted via a pin or shaft 66 and a lever 67 to probe unit 5. Also mounted to unit 5 in any known manner, for example, via screws, etc., is a plurality of microswitches 68–71 and their respective contact actuators 72–75, each of said microswitches being actuated by one of said probe pins. For example, probe pin 65, which is spring-loaded by means of spring 80, determines the condition of microswitch 69 by moving up or down causing lever 67 to pivot about pin 66, this in turn causing a set screw 81 to depress or release contact actuator 73. Thus, it is seen that the condition of a tire rolling over the probe pins will control the output of the microswitches since a bald tire will cause a pin to be depressed thereby releasing the contact actuator associated therewith and thereby determining the output of the associated microswitch. The microswitch outputs, the 80 binary signals previously mentioned, are connected, as previously discussed, to parallel-to serial converter 20.

In order to adjust the responsiveness of the probe unit so as to vary the depth of grooves which are found acceptable, set screw 81 is screwed further into or out of a thread 82 formed in lever 67 causing screw 81 to be closer to or farther from contact actuator 73, this in turn determining the distance probe pin 65 must be depressed in order to release actuator 73. Thus, if the distance 83 which screw 81 extends above lever 67 is decreased, pin 65 must be depressed a lesser distance in order to release actuator 73 and thus a deeper groove would be required to cause a "pass" signal.

Referring now to FIGS. 5A and 5B, there is illustrated in FIG. 5B a parallel-to-serial converter for converting the 80 parallel signals from control units 5, 6, 8 and 9 into 80 serial signals and FIG. 5A illustrates the clock and counter circuits utilized in actuating the converter of FIG. 5B.

Referring first to FIG. 5A, system start units 4A and 4B, which are mounted on support plates 1 and 2, as illustrated in FIG. 1, are depressed by the left and right tires, respectively, which are also in contact with probe units 5, 6, 8 and 9, as well as in contact with probe units 7 and 10, the function of which will be discussed below. The output signals from start units 4A and 4B are applied to AND gate 160, thereby insuring that the vehicle is properly aligned and both front tires thereof contact their respective probe units simultaneously since if the vehicle is misaligned, one of the start units 4A or 4B will not provide a signal to AND gate 116 and the system will not start. The output of AND gate 160 is provided to a clock 161 for actuation thereof, said clock providing output pulses $C_1 \ldots C_n$. Clock pulses $C_1 \ldots C_n$ are provided to a counter 162 which has an output every second clock pulse, these outputs being indicated as $T_1$, $T_2$ and $T_3$, whereby $T_1$ occurs at $C_2$, $T_2$ occurs at $C_4$ and $T_3$ occurs at $C_8$. Clock output pulses $C_1 \ldots C_n$ are also provided to counter 163 which provides outputs $M_1 \ldots M_{10}$, these outputs occurring every 16 clock pulses. Thus, $M_1$ occurs during the first 16 clock pulses, $M_2$ occurs during the second 16 clock pulses, $M_3$ occurs during the third 16 clock pulses, and so on.

Turning now to FIG. 5B, it will be understood that probe units 5, 6, 8 and 9 simultaneously provide 80 pin condition indications to multiplexers 1–10. Thus, referring to FIGS. 3A and 3B, it is seen that the left tire provides pin condition indications 40–59 responsive to the ribs and grooves of the left outside of the left tire and pin condition indications 90–109 responsive to the ribs and grooves of the right outside of the left tire. In the same manner probe units 8 and 9 perform the same function for the right tire. Probe unit 5 provides its 20 pin indication signals to multiplexers 1, 2 and 3, each of which is capable of receiving 8 pin condition indication signals and, therefore, the signals related to the condition of pins 40–47 are provided to multiplexer 1, the signals related to the condition of pins 48–55 are provided to multiplexer 2, and the signals related to the condition of pins 56–59 are provided to multiplexer 3, thereby utilizing only half the capacity thereof. AS will be understood by referring to FIG. 5B, the same conditions prevail with regard to probe unit 6 and multiplexers 3–5, probe unit 9 and multiplexers 6–8, and probe unit 8 and multiplexers 8–10. Multiplexers 1–10 are also provided with signals $T_1$, $T_2$ and $T_3$ from counter 162, thereby providing at the respective outputs thereof, in serial fashion, the 8 input signals to each of the multiplexers, that is, multiplexer 1 provides signals 40–47 at its output in a serial fashion and the same is true for multiplexers 2–10. Each of the multiplexer outputs is provided to a NAND gate, gates 164–173, respectively, which is in turn gated with signals $M_1$–$M_{10}$, respectively, as provided by counter 163, previously discussed. Thus, each group of eight serial signals provided to the NAND gates 164–173 is provided to terminal 175 in serial fashion and the output at terminal 175 is a series sequence in time of signals 40–59 and 90–149.

The logic chosen for this system is such that a probe pin in an "up" condition, i.e., one which is in a groove, is a "1" whereas a pin which is depressed due to contact with a tire rib or with a worn groove is a "0." The pin "up" condition which is transmitted from a probe unit to a multiplexer, and through an active NAND gate, is transmitted to terminal 175 as a "0" and a depressed pin is transmitted to terminal 175 as a "1," from which it is transmitted to logic network 21, the operation thereof to be discussed below.

Going further now into the theory of operation of the system, the probe pins, which were discussed with regard to FIGS. 3A and 3B, are on centers one-sixteenth of an inch apart and, as previously mentioned, it has been determined that it is sufficient to measure the depth of the outside grooves 31 and 32, together with one of the center grooves, to determine if the tire is satisfactory for safe use. A study of tires made in the United States has been conducted and it has been found that the maximum outside rib width, i.e., the distance from the sidewall to the first groove, is a maximum of three-fourths of an inch or, as it may alternatively be stated, 12 probe pins wide. Thus, leaving a margin for error, the depth of and occurrence of outside grooves 31 and 32 may be measured by counting 14 pins in from the first depressed pin, where the first depressed pin is caused by the outside of the tire, indicated at 180 and 181 of FIG. 2. If none of the first 14 pins of a probe unit remains up due to its entrance into, for example, grooves 31 or 32, it will be seen that grooves 31 and/or 32 are worn to such an extent that the pins in contact therewith are depressed.

Figure 6:
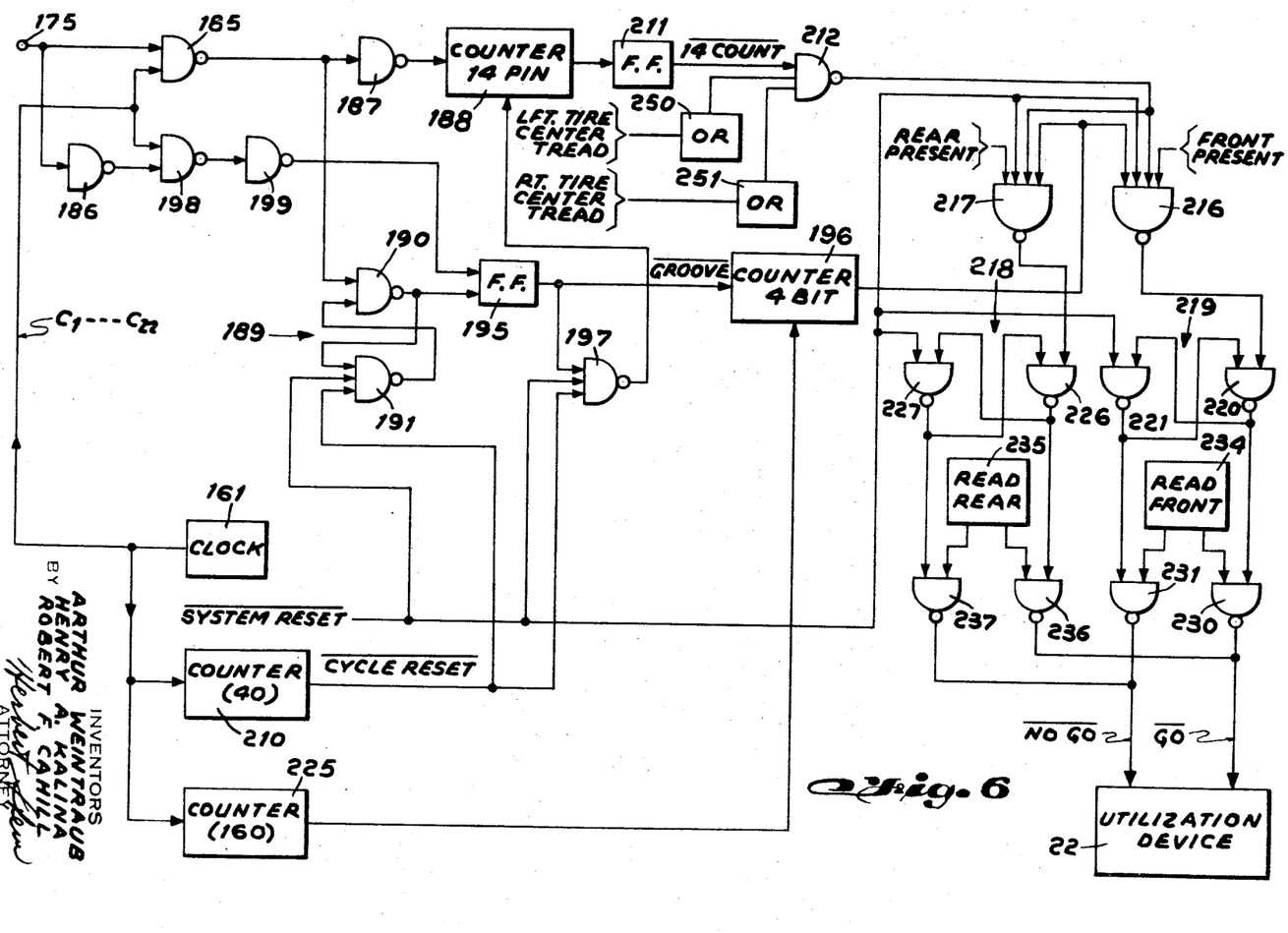
FIG. 6 is a schematic diagram of the logic network utilized in conjunction with the instant invention and illustrated in FIG. 1.

Referring now to FIG. 6, there is illustrated the logic network utilized in the instant system. The aforementioned 80 serial pin condition signals appear at terminal 175. As the outermost edge of the tire, i.e., the sidewall edge, comes into contact with the probes, a first pin is depressed providing a "1" at terminal 175 which is inverted to a "0" by NAND gate 185, to a "1" by NAND gate 187, and which causes a first count in 14 pin counter 188. The "0" from gate 185 is also transmitted to bistable flip-flop 189 composed of NAND gates 190 and 191 setting flip-flop 189 and enabling flip-flop 195 which will have a "1" output. The "1" output from flip-flop 195 is transmitted on the groove line to counter 196 indicating that no groove has been located and the output of flip-flop 195 is also transmitted to NAND gate 197. The other two inputs to NAND gate 197 are "1's" from system reset and cycle reset, both of which are "1's" since neither the system nor the cycle has been reset at this time. As all the inputs to gate 197 are "1's," the output therefrom is a "0" which is transmitted to the reset terminal of counter 188, thereby allowing counter 188 to continue its count. Returning to terminal 175, the depressed pin providing a "1" at the terminal is inverted by NAND gate 186 and the "0" from gate 186 is inverted twice by NAND gates 198 and 199 providing a "0" to flip-flop 195 which has been enabled by flip-flop 189 but which will not count the "0" provided by NAND gate 199.

At this point it is appropriate to note that clock 161 is providing timing for the logic network as well as for the parallel-to-serial converter 20, and is connected to one input of NAND gate 185 and one input of NAND gate 198, thereby providing gating signals for the probe condition signals appearing at terminal 175, it being remembered that one pin condition signal is transmitted for every two clock pulses. At the same time clock pulses $C_1 \ldots C_n$ are transmitted to counter 210 which provides an output for every 40th clock pulse, this occurring once for every 20 pin condition pulses, thereby providing a cycle reset signal. Referring to FIG. 1, it will be seen that there are two cycles for each tire, i.e., each tire is being tested by two units of 20 pins each, the center tread probe units 7 and 10 being disregarded at this time.

The pulses provided at terminal 175 will continue to be "1's" as long as no groove of sufficient depth is located and pins are depressed. It will be understood that the count in counter 188 is increasing by one for each pin which is depressed and that flip-flop 195 will maintain its "1" output. Assuming now, however, that the tire under test is satisfactory, a first groove will be located by one of the first 14 pins after the first depressed pin and that the probe pin will be in an "up" position. This will cause the signal at terminal 175 to be a "0," this "0" being inverted by gates 185 and 187, causing a "0" to be applied at the input of counter 188 thereby maintaining, rather than increasing, the count in counter 188. The "0" at terminal 175 is also provided to flip-flop 195 via gates 186, 198 and 199 and the pulse from gate 199 is a "1" causing a "0" output from flip-flop 195, it being understood that the "1" output from gate 185 does not affect flip-flop 189 and, therefore, flip-flop 195 remains in its enabled condition. The "0" output from flip-flop 195 is provided to counter 196 on the groove line indicating that a groove has been found, and counter 196, a 4-bit counter, is now counting its first pulse. At the same time the "0" output from flip-flop 195 is transmitted to gate 197 changing the output thereof to a "1" which in turn resets 14 pin counter 188 back to its "empty" state. It will be seen that as long as counter 188 does not have an output, that is to say, its output remains "0," the state of flip-flop 211 does not change and therefore it does not transmit a "0" on the 14 count line to AND gate 212. If, on the other hand, the tire under test is not satisfactory and the first groove is worn, a pin "up" position will not occur within the first 14 pin condition counts or signals and therefore a series of "1's" will be provided at terminal 175 causing counter 188 to have an output. Further, the output of flip-flop 195 will not be set to "0," this in turn providing both that counter 188 will not reset and that counter 196 will not receive its first count. Thus, it is seen that if a tire is in satisfactory condition the network conditions at the end of the first 20 pin probe unit examination will be a "1" applied to gate 212 by the 14 count line and a single count in counter 196 due to the fact that the first groove has been located. On the other hand, if this test by the first probe unit resulted in a worn tire indication flip-flop 211 will be providing a "0" to gate 212 and counter 196 will not have counted its first pulse. At the end of each probe unit examination, this examination requiring 40 clock pulses, a cycle reset signal is transmitted from counter 210 to flip-flop 189 and NAND gate 197. The cycle reset signal transmitted to flip-flop 189 resets the flip-flop in preparation for the first pin "down" signal appearing at terminal 175 due to the other outer edge of the tire under test. The resetting of flip-flop 189 also resets flip-flop 195 preparing it to again be enabled by the output signal from flip-flop 189. The cycle reset pulse provided to gate 197 serves to reset 14 pin counter 188, also preparing it to receive pin condition signals from the next 20 pin unit.

As previously mentioned, each tire transmits 40 signals due to the two outer groove condition measurements and the above discussed process will occur four times for the front tires, i.e., pin units 5, 6, 8 and 9 will provide the 80 serial counts due to the two left tire outside groove and the two right tire outside grooves. If both tires are found to be in satisfactory condition, and have satisfactory peripheral grooves, it will be understood that the input to gate 212 from flip-flop 211 will always be a "1" and will not change to a "0" since the occurrence of a groove will always be signalled within 14 counts. In the same manner it will be understood that flip-flop 195 will have provided four output pulses since on four different occasions it will have been provided with a pulse due to the occurrence of a first "pin up" after the first pin down, there being two such pulses for each tire.

It will be recalled at this time that two probe units, 7 and 10, were provided for determining that at least one of the center grooves of each of the tires under test was of satisfactory depth. Each of the 20 probe pins of units 7 and 10 is connected to a microswitch, as illustrated in FIG. 4, and the output of each probe unit and group of 20 microswitches is connected to an OR gate 250 and 251, respectively. OR gates 250 and 251 provide an output pulse whenever any of the pins from its associated probe unit are "up," i.e., have entered a groove. If each tire leaves one of the probe pins from its associated probe unit in an "up," or non-depressed condition, it will be seen that all three inputs to gate 212 will be "1's," thereby providing a "1" output from gate 212 which is transmitted to NAND gate 216 and to NAND gate 217. The output pulse from counter 196, said output being caused by the reception of four input pulses from flip-flop 195, as previously discussed, is also provided to NAND gates 216 and 217. A third common input to each of the NAND gates 216 and 217 is a system reset signal which is also a "1" at this time since the system is not presently being reset. Each of the NAND gates 216 and 217 also have a fourth input, the fourth input to NAND gate 216 being a front tire present signal, and the fourth input to 217 being a rear tire present signal, these two "presence" signals to be discussed below.

If front tires are under test the front tire present signal pulse is a "1" and therefore the four inputs to gate 216 are "1's," thereby providing a "0" output therefrom. The rear tire present signal pulse to gate 217 is a "0," providing a "1" output therefrom, which has no effect on flip-flop 218 and which is therefore left non-effective at this time. The "0" output from gate 216, however, actuates flip-flop 219, and since the flip-flop is composed of NAND gates 220 and 221, the output from gate 220 is a "1" and the output of gate 221 is a "0." It will be understood at this time, of course, that if either of the left or right tires had not provided "pass" signals to gate 212, a "1" would not have been provided to gate 216 and therefore flip-flop 219 would not have been set. At this point it is seen that the tread condition of both front tires has been measured and the "pass" or "fail" condition has been stored by flip-flop 219 where it will remain until the system is reset.

At this time the 80 serial pulses from the four 20 pin units, 5, 6, 8 and 9, have arrived at terminal 175 and 160 clock counts $C_1 \ldots C_n$ have occurred. A 160 pulse counter 225 is connected to the output of clock 161 and at the termination of the front tire measurement, after 160 clock pulses have occurred, counter 225 provides an output pulse which is used to reset 4-bit counter 196, setting the counter back to its "empty" condition. Cycle reset, which occurs at the termination of the output of each of the 20 pin units, i.e. every 40 clock pulses, also occurs at this time, resetting counter 188, flip-flop 189 and, therefore, flip-flop 195, and is applied to gate 197 thereby causing the reset of 14 pin counter 188.

As the vehicle rolls forward the front tires leave probe units 5–10 and the left and right rear tires of the vehicle roll onto probe units 5–10. The above discussed cycle will now repeat with regard to 80 new serial pulse signals excepting this time the rear tire present signal pulse input to gate 217 is a "1," thereby providing a "0" output from gate 217, while the front tire present signal pulse to gate 216 is a "0," thereby providing a "1" output from gate 216. Since flip-flops 218 and 219 are of the type which are set in response to the negative going edge of a received pulse, the "1" output from gate 216 will have no effect on flip-flop 219 while the "0" output from gate 217 will set flip-flop 218 which is comprised of NAND gates 226 and 227 so that the output from gate 226 is a "1" and the output from gate 227 is a "0." When it is desired to read out the tread conditions of the tires under test, a "read front" signal ("1") is provided to NAND gates 230 and 231, the "1" applied to gates 230 and 231 being provided in any known manner, for example, by pushbutton. The inputs to NAND gates 230 are a "1" provided by gate 220 and a "1" provided by the "read front" pulse which results in a "0" output from gate 230 which is transmitted to the $\overline{Go}$ line which may, in turn, be interpreted as a "pass" condition. In the same manner, a "0" is provided to gate 231 from gate 221 while a "1" is provided thereto by the "read front" pushbutton resulting in a "1" output from gate 231 which is applied to the $\overline{No-Go}$ line which may also be interpreted as a "pass" signal. When it is desired to read out the tread condition of the rear tires a "read rear" pushbutton, or alternatively, an automatic cycling device of a type known in the art and indicated at 235, provides "1's" to the inputs of NAND gates 236 and 237. Gate 236 also receives a "1" from gate 226 resulting in a "0" output therefrom which is transmitted to the $\overline{Go}$ line while gate 237 receives a "1" from the "read rear" pushbutton 235 and a "0" from gate 227 resulting in a "1" output therefrom which is transmitted to the $\overline{No-Go}$ line which may also be interpreted as a "pass" condition.

The $\overline{Go}$ and $\overline{No-Go}$ lines are both connected to utilization device 22 which may provide an audio or visual signal to the conductor of the test. In the event that one of the four tires is not satisfactory, for example, if one of the center grooves is not sufficiently deep, or if a groove is not found within fourteen counts for both the inside and outside grooves of both tires, it will be seen that a "0" rather than a "1" will be provided to gates 216 and 217, said "0" being transmitted as a "1" by gate 216 if the failure is in the front tire. This results in a "1" being transmitted to flip-flop 219 which in turn results in a "0" being applied to a gate 230 with the result that a "1" is provided at the output thereof at the time the "read front" pushbutton 234 is depressed. A "1" output on the $\overline{Go}$ line will, of course, be interpreted as a "fail" signal.

At the end of the read-out procedure, whereby "fail" and "pass" indications for the front and rear tires are displayed, a system reset signal, generated in a manner which will be explained below, is provided to flip-flop 189 which disenables flip-flop 195. The system reset signal is also applied to NAND gate 197, which causes the reset of counter 188, and gates 216 and 217, resulting in "1" outputs from both gates which are applied to flip-flops 219 and 218, respectively. The system reset signal is also applied to NAND gates 221 and 227, resetting flip-flops 218 and 219 preparing the system for the next vehicle to be tested.

Figure 7:
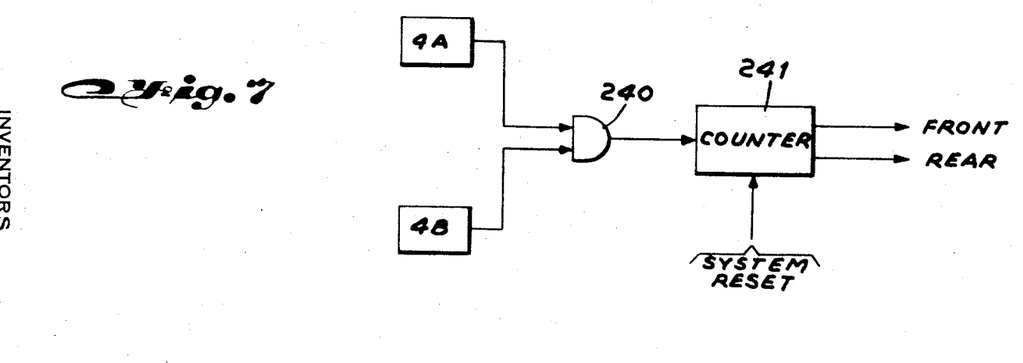
FIG. 7 is a schematic drawing of a control circuit utilized to provide necessary signals to the logic network illustrated in FIG. 6.

Referring now to FIG. 7, there is illustrated a control circuit which may be used in conjunction with the logic network illustrated in FIG. 6 to provide the "front tire present" and "rear tire present" signals which are provided to NAND gates 216 and 217, respectively, these "presence" signals providing the probe pin condition signals which are provided by the front and rear tires are transmitted to the appropriate hold flip-flops, 219 or 218, respectively. Start units 4A and 4B are connected to AND gate 240, for example, by simple two position switches, and when both units are simultaneously depressed by the left and right tires, respectively, a "1" is provided at the output of gate 240. If the tires which are depressing units 4A and 4B are the front tires, two bit counter 241, upon reception of the "1" from gate 240, provides a "1" at the "front" line thereof and a "0" at the "rear" line thereof. The "1" on the "front" line is provided to gate 216 as the previously discussed "front tire present" signal and the "0" is provided to gate 217. When the rear left and right tires contact units 4A and 4B, another "1" pulse is provided to counter 241 changing the output thereof, and a "1" is now on the "rear" line and a "0" is on the "front" line, thus providing a "1" to gate 217 and a "0" to gate 216. At the termination of the test, system reset is applied to counter 241 resetting it and preparing it to respond to the front tires of the next vehicle to be tested.

System reset may be obtained in any one of a number of conventional ways. For example, system reset may be provided by a pushbutton which is manually operated by the system controller upon the departure of a vehicle under test, or alternatively, it may be a pushbutton switch which is manually operated by the system controller immediately prior to the entrance of a vehicle into the test station. An automatic device for providing the desired system reset signal is, for example, an electric eye located at either the exit or entrance of the test station which is actuated by the departure or entrance of the test vehicle. Alternatively, an automatic system reset signal may be provided by a road mounted switch which is depressed by the test vehicle upon its departure from the test station, thereby preparing the system for the next vehicle to be tested, or a road mounted switch which is located at the entrance to the test station which prepares the station for the vehicle presently actuating the switch. Although none of the various methods of achieving system reset have been illustrated, it will be clear to those skilled in the art that they may be of conventional design and of the type frequently used in conjunction with automatic sequencing operations.

While the principles of the invention have been described in connection with specific structure, it is to be clearly understood that this description is made only by way of example and not as a limitation to the scope of the invention, as set forth in the objects thereof and in the accompanying claims.

We claim:

1. An automatic tire tread depth measurement system comprising:

support means for positioning and supporting a tire having a tread to be tested;

a plurality of vertically movable probes extending from said support means for sensing the tread condition of said tire, a plurality of switches each coupled to a respective probe and providing a plurality of condition signals corresponding to the presence and absence of grooves exceeding a selected depth in said tire treads, each of said probes adapted to be depressed less than a first distance upon alignment with a tread groove exceeding said selected depth and depressed a second distance equal to or greater than said first distance upon alignment with a portion of said tread other than a groove exceeding said selected depth, each switch providing a first probe signal when the probe to which it is coupled is depressed less than said first distance and a second probe signal when the probe to which is it coupled is depressed said second distance; and logic means coupled to said switches responsive to said plurality of condition signals for providing a first decision signal when said tire tread is satisfactory and a second decision signal when said tire tread is unsatisfactory.

2. The automatic tire tread depth measurement system, according to claim 1, wherein said plurality of probes comprises:

a first group of probes positioned to contact a first outer tread portion of said tire, said first outer tread portion including a first outer groove;

a second group of probes positioned to contact a second outer tread portion of said tire, said second outer tread portion being opposite said first outer portion and including a second outer groove; and a third group of probes positioned to contact a center tread portion of said tire, said center tread portion including a center groove.

3. The automatic tire tread depth measurement system, according to claim 3, wherein said probe signals provided by said plurality of switches coupled to said first and second groups of probes occur simultaneously, and including a parallel-to-serial converter coupled to receive said probe signals from said switches coupled to said first and second groups of probes and provide first and second serial groups of pulse signals corresponding to the positions of the probes of said first and second probe groups, respectively;

said logic means being coupled to receive the probe signals from said switches coupled to said third group of probes for providing a compound signal in response to the presence of at least one first probe signal among said last mentioned probe signals, said first and second serial groups of pulse signals and said compound signal together comprising said plurality of condition signals for said logic means.

4. The automatic tire tread depth measurement system, according to claim 3, wherein said logic means includes means responsive to said first and second serial groups for providing an affirmative signal when a first probe signal occurs within a selected number of pulses after the initial second probe signal in each of said serial groups.

5. The automatic tire tread depth measurement system, according to claim 4, wherein said responsive means includes:

a pulse counter; and means for resetting said counter after the reception of said first serial group and prior to the reception of said second serial group.

6. The automatic tire tread depth measurement system, according to claim 5, further comprising:

combining means coupled to receive said affirmative signal and said compound signal to provide a combination signal in response thereto; and processing means responsive to the presence of said combination signal for providing said first decision signal and to the absence of said combination signal for providing said second decision signal.

7. An automatic tread depth measurement system for automobile tires comprising:

first and second support means each adapted to receive one of a pair of tires mounted on a first axle, said first and second support means being laterally displaced one from the other; and sensing means coupled to said first and second support means, said sensing means responsive to the depth of the two outer tread portions and the center tread portion of each of said pair of tires for providing a first decision signal if all said tread portions exceed a preselected depth, and a second decision signal if any one of said tread portions does not exceed said preselected depth, first, second and third groups of vertically movable probes mounted in said first support means;

fourth, fifth and sixth groups of vertically movable probes mounted in said second support means, each of the probes of said first and second probe groups and said fourth and fifth probe groups positioned to be moved a distance related to the depth of the two outer tread portions of each of said pair of tires respectively, and each of the probes of said third and sixth probe groups positioned to be moved a distance related to the depth of the center tread portion of each of said pair of tires, respectively;

a plurality of switches, each switch coupled to a respective one probe of said probe groups for providing a position signal dependent upon the vertical position of the associated probe for providing a plurality of position signals; and logic means coupled to receive said plurality of position signals and providing said first and second decision signals in response thereto.

8. The automatic tread depth measurement system for automobile tires, according to claim 7, further comprising:

first contact means mounted on said first support means responsive to the presence of a tire thereon and providing a first contact signal;

second contact means mounted on said second support means responsive to the presence of a tire thereon for providing a second contact signal; and control means responsive to said first and second contact signals for preparing said system to respond to said pair of tires and to subsequent contact signals for preparing said system to respond to subsequent pairs of tires.

* * * * *